United States Patent
Bösch

(10) Patent No.: US 12,276,754 B2
(45) Date of Patent: Apr. 15, 2025

(54) LASER DISTANCE METER

(71) Applicant: LEICA GEOSYSTEMS AG, Heerbrugg (CH)

(72) Inventor: Thomas Bösch, Lustenau (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 1168 days.

(21) Appl. No.: 16/388,762

(22) Filed: Apr. 18, 2019

(65) Prior Publication Data

US 2019/0324121 A1    Oct. 24, 2019

(30) Foreign Application Priority Data

Apr. 19, 2018    (EP) .................................... 18168313

(51) Int. Cl.
| | | |
|---|---|---|
| G01S 7/481 | (2006.01) | |
| G01S 7/51 | (2006.01) | |
| G01S 17/08 | (2006.01) | |
| G01S 17/86 | (2020.01) | |

(Continued)

(52) U.S. Cl.
CPC ............... *G01S 7/4811* (2013.01); *G01S 7/51* (2013.01); *G01S 17/08* (2013.01); *G01S 17/86* (2020.01); *G01S 17/74* (2013.01); *G01S 17/87* (2013.01)

(58) Field of Classification Search
CPC ........ G01S 7/481; G01S 7/4811; G01S 17/08; B29C 45/00
See application file for complete search history.

(56) References Cited

U.S. PATENT DOCUMENTS

| | | | | |
|---|---|---|---|---|
| 5,324,473 A | * | 6/1994 | Baresich | ................. B29C 45/73 264/327 |
| 5,718,850 A | * | 2/1998 | Takano | ............ B29D 11/00528 425/149 |
| 6,046,795 A | | 4/2000 | Sugiyama et al. | |

(Continued)

FOREIGN PATENT DOCUMENTS

| | | |
|---|---|---|
| CN | 101655350 A | 2/2010 |
| CN | 101839709 A | 9/2010 |

(Continued)

OTHER PUBLICATIONS

English Machine Translation of JP2012254538A: Yoji Tanaka, "Manufacturing method of composite optical component," Dec. 2012, JP2012254538A (Year: 2012).*

(Continued)

*Primary Examiner* — Yuqing Xiao
*Assistant Examiner* — Zhengqing Qi
(74) *Attorney, Agent, or Firm* — Maschoff Brennan

(57) ABSTRACT

A laser distance meter consisting of an optical emitting path having an optical emitter and emitting optics and a receiving path having receiving optics and an optical detector. In this case, an optics mount completely optically isolates the emitting path and receiving path from one another and fixes the components thereof. The emitting optics and receiving optics are designed as plastic components transmissive to the measuring beams, and the optics mount is designed as a plastic component opaque to the measuring beams. The material composite of the emitting optics, the receiving optics, and the optics mount are designed as a 2-component injection molded part.

11 Claims, 2 Drawing Sheets

(51) Int. Cl.
 *G01S 17/74* (2006.01)
 *G01S 17/87* (2020.01)

(56) References Cited

U.S. PATENT DOCUMENTS

| | | | | |
|---|---|---|---|---|
| 6,781,675 | B2* | 8/2004 | Gogolla et al. | 356/4.01 |
| 7,995,189 | B2 | 8/2011 | Yamaguchi et al. | |
| 8,373,128 | B2 | 2/2013 | Yamaguchi et al. | |
| 9,261,362 | B2 | 2/2016 | Gogolla et al. | |
| 9,534,951 | B2 | 1/2017 | Buchwald et al. | |
| 10,488,518 | B2 | 11/2019 | Geiger et al. | |
| 2008/0144022 | A1* | 6/2008 | Schulat | G01N 21/8483 356/213 |
| 2008/0218760 | A1* | 9/2008 | Sprenger | G01S 7/481 356/445 |
| 2008/0266544 | A1* | 10/2008 | Wolf | G01S 17/36 356/5.01 |
| 2013/0135604 | A1* | 5/2013 | Gogolla | G01S 7/4972 356/4.01 |
| 2013/0135605 | A1 | 5/2013 | Wada | |
| 2013/0265776 | A1* | 10/2013 | Zollner | B29D 11/00 362/335 |
| 2013/0271744 | A1* | 10/2013 | Miller | G01C 3/08 356/4.01 |
| 2015/0204976 | A1 | 7/2015 | Bosch | |
| 2016/0003944 | A1* | 1/2016 | Schmidtke et al. | G01S 17/08 |

FOREIGN PATENT DOCUMENTS

| | | | | |
|---|---|---|---|---|
| CN | 103134470 A | | 6/2013 | |
| CN | 104508425 A | | 4/2015 | |
| CN | 104704347 A | | 6/2015 | |
| DE | 198 04 059 A1 | | 8/1999 | |
| DE | 10 2011 076 491 A1 | | 11/2012 | |
| DE | 202014005479 U1 | | 9/2014 | |
| DE | 20 2014 005 508 U1 | | 10/2014 | |
| GB | 2 333 920 A | | 8/1999 | |
| IN | 107850427 A | | 3/2018 | |
| JP | 2010243659 A | * | 10/2010 | |
| JP | 2012254538 A | * | 12/2012 | |
| TW | 202131016 A | * | 8/2021 | G01S 17/93 |
| WO | 2010/108706 A1 | | 9/2010 | |

OTHER PUBLICATIONS

English Machine Translation of TW202131016A: Pacala et al., "Light Ranging Device With Electronically Scanned Emitter Array and Synchronized Sensor Array," Aug. 2021, TW202131016A (Year: 2021).*
Manual for Makita LD080PI: "Makita_manual.pdf" accessed Aug. 26, 2022 (Year: 2022).*
https://www.immould.com/top-10-materials-for-injection-molding/, "Top 10 Materials Used For Injection Molding" accessed Aug. 26, 2022 (Year: 2022).*
Kamal, M.R. and Tan, V. (1979), Orientation in injection molded polystyrene. Polym Eng Sci, 19: 558-563. (Year: 1979).*
https://www.makita.co.nz/products/model/LD080PI, "LD080PI Laser Distance Meter," Apr. 18, 2017 (Year: 2017).*
http://www.porcupinelabs.com/lr4, "LR4—Precision USB Laser Rangefinder," Dec. 8, 2014 (Year: 2014).*
http://www.makeitfrom.com/material-properties/Polystyrene-PS, "Polystyrene (PS)," Jul. 9, 2017 (Year: 2017).*
Machine Translation of JP2010243659A (Year: 2010).*
T. Rogers, "Everything You Need To Know About Polycarbonate (PC)" published Aug. 21, 2015. Accessed from "/ www.creativemechanisms.com/blog/everything-you-need-to-know-about-polycarbonate-pc" with WayBack Machine dated Aug. 26, 2015. (Year: 2015).*
"Plastic Injection Molding with Nylon (Polyamide)," accessed from "texasinjectionmolding.com/nylon-pa-injection-molding/" with WayBack Machine dated Feb. 7, 2018. (Year: 2018).*
"Coefficient of Linear Thermal Expansion," accessed from "omnexus.specialchem.com/polymer-properties/properties/coefficient-of-linear-thermal-expansion" with WayBack Machine dated May 8, 2017. (Year: 2017).*
Shen, L., Du, Q., Wang, H., Zhong, W. and Yang, Y. (2004), In situ polymerization and characterization of polyamide-6/silica nanocomposites derived from water glass. Polym. Int., 53: 1153-1160. (Year: 2004).*
"Lexan sheet Solid un-coated and coated sheet Technical Manual," accessed from "sfs.sabic.eu/wp-content/uploads/resource_pdf/1345453948-48623687-Technical-Manual-Coated-Uncoated-Sheet.pdf" with WayBack Machine dated Mar. 16, 2015. (Year: 2015).*
"PA 66-Nylon 66," accessed from "www.plastopialtd.com/pa-66/" with WayBack Machine dated Mar. 20, 2017. (Year: 2017).*
Extented European Search Report Dated Feb. 11, 2019 as received in Application No. 18168313.7.
Qiming Xin., "Manufacturing Technology of Plastic Aspheric Lens," National Defence Industry Press, pp. 41 (Jan. 2005).

* cited by examiner

LASER DISTANCE METER

CROSS-REFERENCE TO RELATED APPLICATIONS

This application claims priority to European Patent Application No. 18168313 filed on Apr. 19, 2018, which is incorporated herein by reference.

FIELD OF THE INVENTION

The invention relates to a laser distance meter, which comprises an optical emitting path and an optical receiving path, wherein an optics mount optically isolates the two paths from one another. In this case, the optics mount having emitting optics and receiving optics is designed as a 2-component injection molded part.

BACKGROUND

Stationary, movable, or also handheld distance measuring devices, which execute an optical distance measurement to a selected measurement point, are used for laser-based distance measurement. For this purpose, a laser beam is emitted and received again and analyzed after reflection on the target. Various measurement principles are available in this case for determining the distance, for example, phase measurement or time-of-flight measurement.

Since a measurement point visible on the surface to be measured is advantageous for most applications, red lasers are usually used as radiation sources for distance measurement.

Generic laser distance meters comprise optics carriers, which at least partially optically isolate emitting path and receiving path from one another and fix the components thereof. Known embodiments are summarized in the following prior art.

The optics carrier of the distance measuring device from document DE 102011076491 A1 is used for accommodating the optical emitter and the beamforming optical unit and is described as monolithically embodied.

The optics carrier of the distance measuring device from the utility model specification DE 202014005479 U1 is formed in one piece from a hard plastic component and a soft plastic component as a 2-component injection molded part. The optics carrier optically isolates the emitting path and the receiving path at least partially from one another.

The lens holder described in document WO 2010108706 A1 is intended for connection to an optics carrier of a distance measuring device. The lens holder consists of a light-transmissive and a light-opaque plastic component, wherein the light-transmissive region of the connecting area enables local curing of a light-curing adhesive. The lens holder can be designed as a 2-component injection molded part.

The receiving optics of the distance measuring device described in document DE 19804059 A1 are designed as a lens having Fresnel structure. The lens can be manufactured as an injection molded part, for example.

One disadvantage of the cited embodiments of laser distance meters of the prior art is that it is necessary to fix and align the optical components during the installation on the optics carrier.

SUMMARY

The object of some embodiments of the present invention is to provide such a laser distance meter with a lower constructive expenditure.

In particular, it is an object of some embodiments to provide such a laser distance meter which is producible using fewer installation steps.

At least one of these objects is achieved by the implementation of the characterizing features of the independent claim. Features which refine the invention in an alternative or advantageous manner can be inferred from the dependent patent claims.

The laser distance meter according to some embodiments the invention, which is handheld in particular, comprises an optical emitting path and an optical receiving path. In this case, an optical emitter, which emits measuring beams, and emitting optics, which bundle the measuring beams along a first optical axis in the direction of the target object, form the optical emitting path and receiving optics, which bundle the reflected measuring beams along a second optical axis in the direction of an optical detector, forms the receiving path. Furthermore, an optics mount completely optically isolates the emitting path and receiving path from one another and is used for positioning and fixing all components of the emitting path and receiving path.

In this case, both the first optical axis of the emitting path and also the second optical axis of the receiving path are defined in relation to the optics mount. The optical emitter and detector are moreover connected to a circuit on a first printed circuit board (PCB), wherein a second PCB accommodates the corresponding control and evaluation electronics.

According to some embodiments of the invention, the emitting optics and the receiving optics are designed as plastic components transmissive to the measuring beams and the optics mount is designed as a plastic component opaque to the measuring beams. Furthermore, according to some embodiments of the invention, an integral material bond exists between the emitting optics and the optics mount and/or the receiving optics and the optics mount, wherein the material composite in each case of the emitting optics and the receiving optics with the optics mount is designed in the form of a 2-component injection molded part.

By way of manufacturing in the 2-component injection molding method, the otherwise typical alignment and fixing of the emitting optics and receiving optics on the optics carrier is advantageously omitted.

Furthermore, the two plastic components can be adapted to one another in such a way that the difference of the coefficients of thermal expansion is negligible, in particular is less than 30% of the mean value, and therefore changing usage temperatures do not cause tensions in the emitting optics and/or receiving optics, which significantly change the optical properties thereof.

In one advantageous embodiment, the two plastic components can be adapted to one another such that the respective softening temperatures permit merging of the plastics at the bonding surfaces and thus an integral bond of the components results, which meets the requirements for protection class IP67+. In this case, the difference between the softening temperatures is less than 20% of the mean value.

According to a further embodiment, the two plastic components can be adapted to one another so that a type of gradient material is formed at the bonding point, which damps vibrations. Vibrations of the optics mount, for example, caused by impacts, are thus ideally not transmitted to the emitting optics and/or receiving optics.

Furthermore, the optics mount can be formed from a thermoplastic, partially crystalline, and light-scattering plastic component and/or the emitting optics and receiving optics can be formed from a thermoplastic, amorphous, and light-transmissive plastic component.

In a further embodiment, a further soft plastic component, which is used as a connecting material and simultaneously damps vibrations and buffers thermal tensions, is formed in each case between the emitting optics and the optics mount and/or the receiving optics and the optics mount.

According to one embodiment of the laser distance meter, the optics mount comprises positioning devices in the form of recesses and connecting elements in the form of preparations for screw connections for the positioning and fixing of the components of the emitting path and receiving path and the printed circuit boards.

These positioning devices and connecting elements ideally enable exact fixing of the components in relation to one another, so that during the production of distance meters, the optical axes come to rest identically in relation to the optics mount with a high level of reproducibility and negligible alignment effort.

In one advantageous embodiment, the laser distance meter can comprise still further positioning devices in the form of recesses and connecting elements in the form of preparations for screw connections for the positioning and fixing of the laser distance meter in a measuring device housing.

According to a further embodiment, the optical emitter can already be equipped with beamforming optics, wherein the emitting optical unit is optics are then advantageously designed as a window. If the optical emitter does not yet have beamforming optics, the emitting optics can thus be designed as a lens, which bundles the emitted radiation in the direction of the target object. Independently of the embodiment of the emitting optics, the receiving optical unit is optics are advantageously designed as a lens, which bundles the reflected measuring beams in the direction of the detector.

Furthermore, the laser distance meter can additionally comprise an inclination sensor, which is fixed in particular on the optics mount. The distance meter can provide an inclination measurement function via the inclination sensor. For this purpose, exactly aligned optical axes are particularly important, since otherwise in the case of an inclined measurement of an object, discrepancies can exist between the inclination which the inclination sensor measures and the inclination of the optical axis, which results in inaccurate measured values. In this case, the inclination sensor can be used to exactly align—and also realign—the optical axes in relation to a measuring device housing, so that a more exact measurement result is achieved.

According to a further advantageous embodiment, diffuse reflections of the emitted measuring beams can be decoupled at an inner wall of the emitting path defined by the optics mount and deflected as reference beams along a known path directly onto the optical detector. In this case, the decoupling of the reference beam takes place without further means, for example, a beam splitter. For example, the optics mount has a decoupling opening for this purpose, through which the diffusely reflected measuring beams are decoupled from the emitting path as reference beams.

The laser distance meter can comprise additional positioning devices and/or connecting elements for a camera and/or a display screen and/or an input means. The camera can be used in this case for recording images in the direction of the target object. The display screen, in particular a touchscreen, can furthermore be used for the display of images recorded by means of the camera and/or measured and/or computed distances and/or angles. The touchscreen can also be used for inputting numbers and characters and/or for activating functions. The input means, in particular a keypad, can be used for selecting functions.

In a further embodiment, the laser distance meter can additionally comprise a transmitting and receiving unit for the wireless transmission of images and measured values for documentation/synchronization and items of information for operation.

BRIEF DESCRIPTION OF THE DRAWINGS

A laser distance measuring device according to the invention will be described in greater detail hereafter on the basis of a specific exemplary embodiment schematically illustrated in the drawings, wherein further advantages of the invention will also be discussed. In the specific figures.

DETAILED DESCRIPTION

Figure 1:
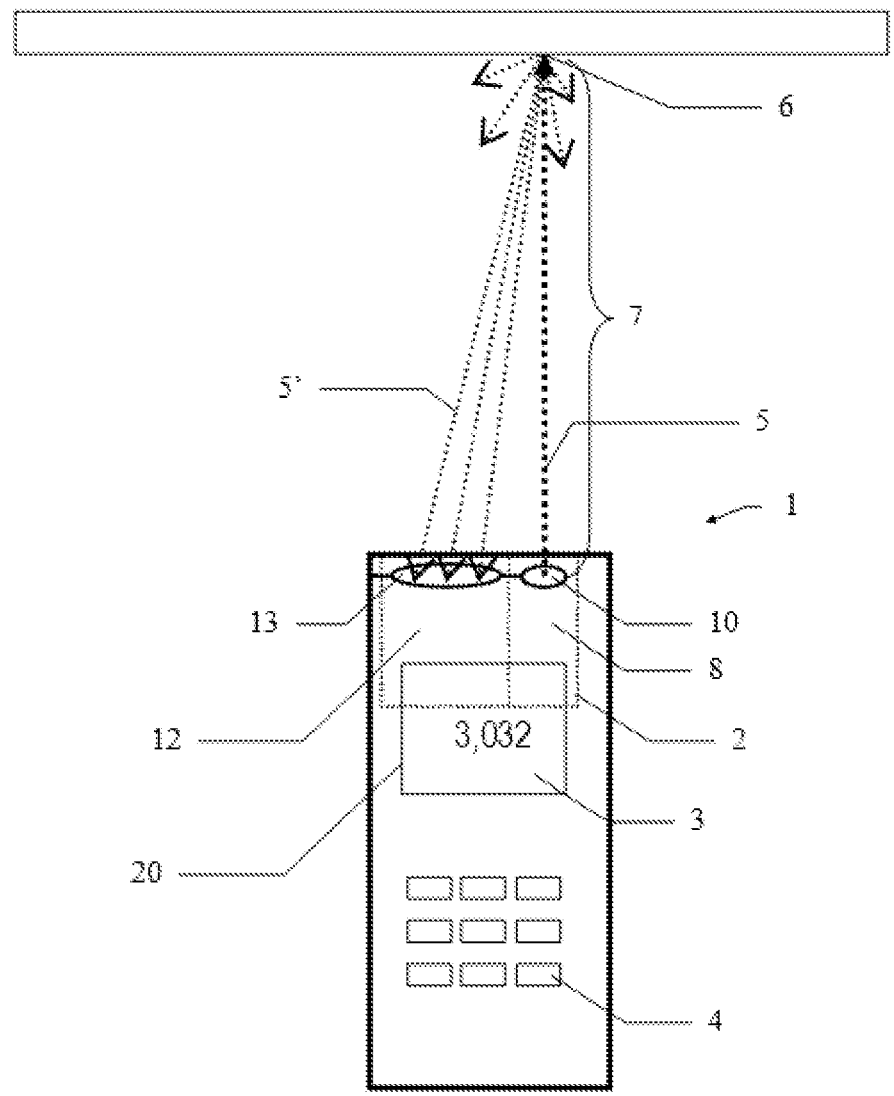
FIG. 1 shows a handheld laser distance measuring device having a laser distance meter according to the invention.

A generic laser distance measuring device 1 having a laser distance meter 2 is shown in an exterior view in FIG. 1. It comprises a housing, in which the required electronic and optical components are arranged. The housing is designed in this case so that the laser distance measuring device 1 can be held in the hand. The laser distance measuring device 1 contains on its front side the laser distance meter 2 having an optical emitting path 8 and receiving path 12. A display device 3 in the form of a display screen and input means 4 in the form of a keypad are located on the upper side of the device.

According to the invention, measuring beams 5 are emitted toward a measuring point 6 on a wall via the optical emitting path 8. The wall has a naturally rough surface, from which the measuring beams are reflected in a scattered manner. A part of the scattered reflected measuring beams 5' is collimated by the receiving path 12, detected, and converted into an electrical signal. The signal is analyzed by an electronic circuit in a way known per se to determine the digital value of the distance 7. For example, a phase measurement or time-of-flight measurement can be used for the distance determination. The value of the measured distance 7 digitally determined by the analysis—of 3.032 m here, for example—can optionally be provided to a user on a display screen 3.

Figure 2:
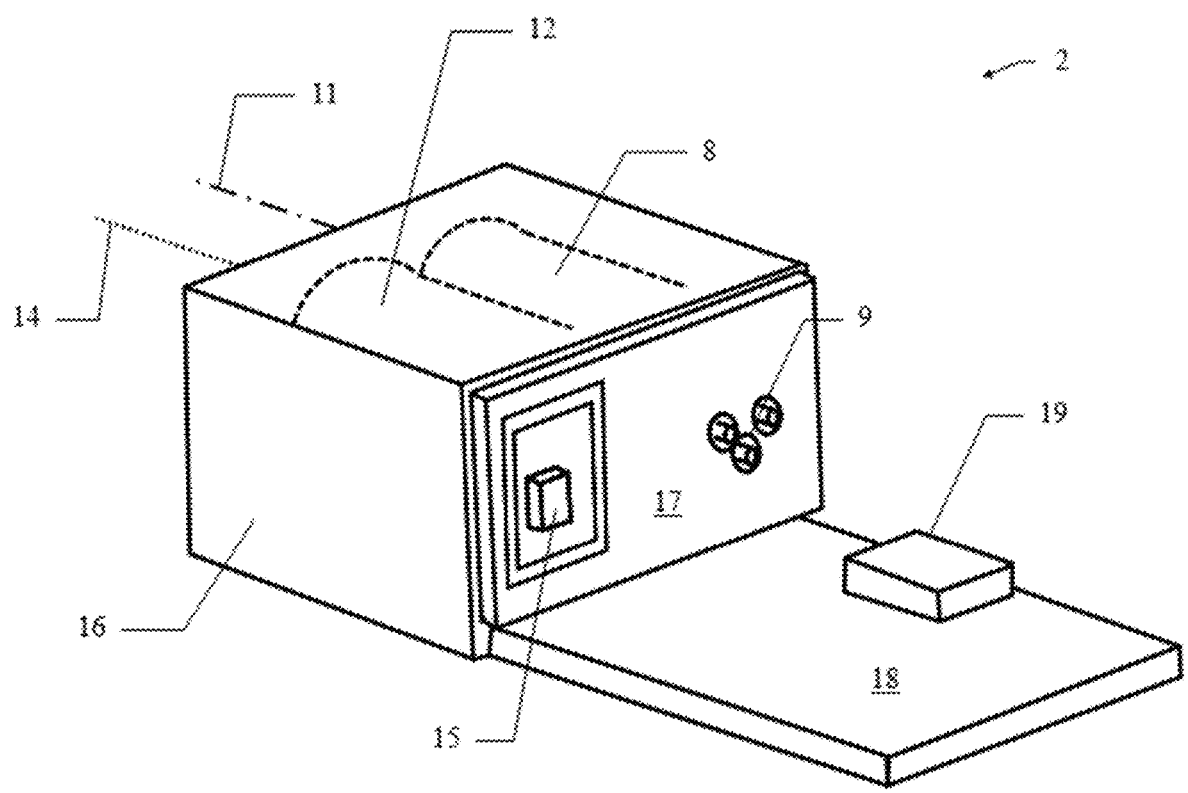
FIG. 2 shows a laser distance meter according to the invention in a top view.
Figure 3:
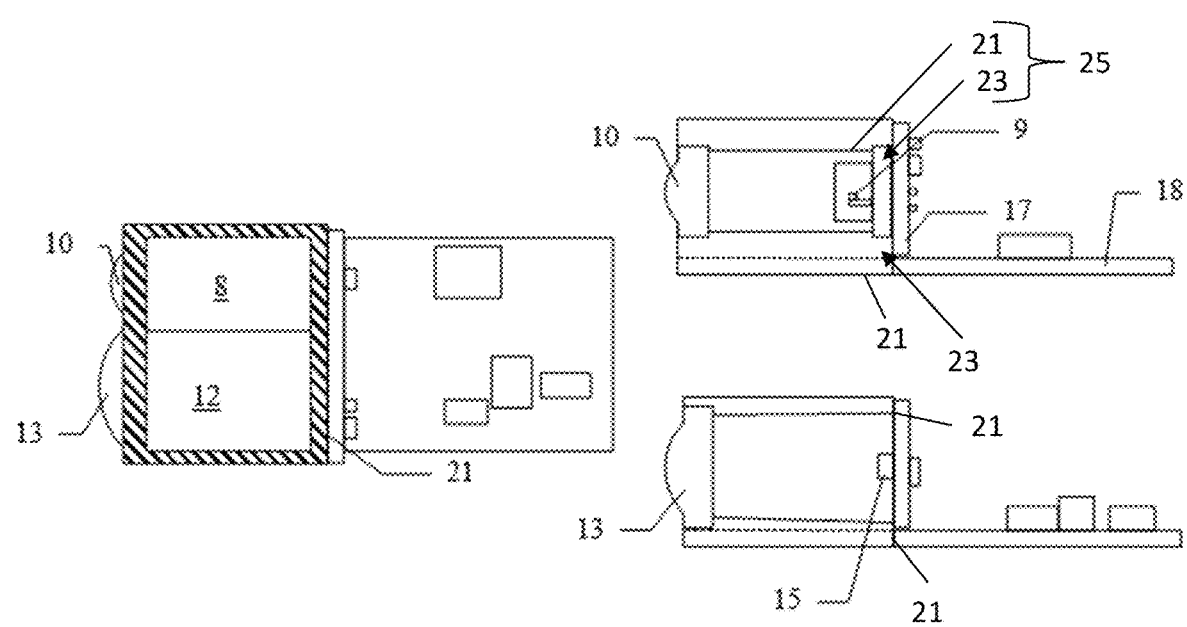
FIG. 3 shows sectional illustrations of the laser distance meter according to the invention shown in FIG. 2.

FIG. 2 shows a perspective view, and FIG. 3 shows corresponding sectional illustrations of a laser distance meter 2 according to the invention. It is schematically indicated in principle that the laser distance meter 2 comprises an emitting path 8 having an emitter 9 and an emitting optical unit 10 for emitting and bundling optical measuring beams along a first optical axis 11 in the direction of a target object. Optically isolated therefrom and displaced in parallel in a plane perpendicular to the first optical axis 11, a receiving path 12 is located, having a receiving optical unit 13 for bundling the measuring beams reflected from a surface of the target object along a second optical axis 14 in the direction of a detector 15. For the control and read-out of the emitter 9 and/or the detector 15, they are connected to a first PCB 17, wherein the control and analysis electronics are located on a second PCB 18. The laser distance meter 2 additionally comprises an inclination sensor 19.

The arrangement of the emitter 9, the emitting optical unit 10, the detector 15, and the receiving optical unit 13 in relation to one another is determined by the fixation thereof on the optical unit mount 16. In this case, the emitting optical unit 10 and the receiving optical unit 13 are integrally bonded to the optical unit mount 16 in the 2-component injection molding method. Therefore, the installation step, during which the emitting optical unit 10 and the receiving optical unit 13 are adhesively bonded to the optical unit mount 16, is omitted. The positioning of the emitter 9, detector 15, and the two PCBs 17, 18 takes place via corresponding recesses 23 and connecting elements 21, for example, press-in devices and screw connections, which are formed during the production of the 2-component injection molded part. For example, the attachment of a laser diode can be provided at the corresponding end of the emitting path. According to one embodiment, the optical unit mount 16 comprises positioning devices 25 in the form of the recesses 23 and connecting elements 21, such in the form of preparations for screw connections for the positioning and fixing of the components of the emitting path and receiving path and the printed circuit boards 17, 18.

Optionally, still further receptacles or connecting elements can be formed for fixing the laser distance meter in a measuring device housing. A cylindrically formed emitting channel or receiving channel, respectively, is formed during the production of the 2-component injection molding part between emitter 9 and emitting optics 10 and detector 15 and receiving optics 13. These two channels are optically isolated from one another. A deflection means can optionally be arranged for deflecting the reflected measuring beams onto the detector 15. In particular, the deflection means can be designed as a filter, so that only the optical measuring frequencies, but not ambient light and scattered light, are deflected in the direction of the detector 15.

The laser distance meter can comprise further technically-routine components and/or functions which are known from the prior art.

It is apparent that these illustrated figures schematically illustrate a possible exemplary embodiment. The approach shown can be combined according to the invention with devices of the prior art.

What is claimed is:

1. A laser distance meter comprising:
    an optical emitting path, which comprises an optical emitter for emitting and emitting optics for bundling measuring beams along a first optical axis in the direction of a target object;
    a receiving path, which comprises receiving optics for bundling reflected measuring beams along a second optical axis in the direction of an optical detector;
    an optics mount, which completely optically isolates the emitting path and the receiving path from one another, fixes the emitting path and the receiving path, so as to define the first and second optical axes with respect to the optics mount;
    a first printed circuit board which accommodates the optical emitter and the optical detector;
    a second printed circuit board which accommodates control and evaluation electronics;
    wherein the emitting optics and the receiving optics are designed as plastic components transmissive to the measuring beams and the reflected measuring beams, respectively; and
    wherein the optics mount is configured as a plastic component opaque to the measuring beams, and
    wherein an integral material bond exists between the emitting optics and the optics mount or the receiving optics and the optics mount, and
    wherein at least one of the integral material bonds between the emitting optics and the optics mount or between the receiving optics and the optics mount is designed in the form of a 2-component injection molded part,
    wherein the optics mount comprises recesses and connecting elements configured to accommodate the first and second printed circuit boards, and
    wherein a part of the first printed circuit board is located outside of a volume enclosed by the optics mount.

2. The laser distance meter according to claim 1, wherein a further, deformable plastic component used as a bonding material is formed respectively between the emitting optics and the optics mount or the receiving optics and the optics mount.

3. The laser distance meter according to claim 1, wherein the optics mount comprises positioning devices for the emitting path, receiving path, and the printed circuit boards.

4. The laser distance meter according to claim 1, wherein the laser distance meter comprises positioning devices for the positioning and fixing in a measuring device housing.

5. The laser distance meter according to claim 1, wherein the emitting optics comprise a window and the receiving optics are designed as a lens.

6. The laser distance meter according to claim 1, wherein the emitting optics and receiving optics are designed as lenses.

7. The laser distance meter according to claim 1, further comprising an inclination sensor.

8. The laser distance meter according to claim 7, wherein the inclination sensor is fixedly connected to the optics mount.

9. The laser distance meter according to claim 1, further comprising:
    positioning devices or connecting elements for:
        a camera for recording images in the direction of the target object,
        a touchscreen, for
            displaying images recorded by means of the camera,
            putting characters and numbers,
            activating functions, or
        an input means for selecting functions.

10. The laser distance meter according to claim 1, further comprising a transmitting and receiving unit for wirelessly transmitting images of measured values for documentation or synchronization items of information for operation.

11. The laser distance meter according to claim 1, further comprising a transmitting and receiving unit for wirelessly transmitting images of measured values for documentation or synchronization items of information for operation.

* * * * *